(12) United States Patent
Ko et al.

(10) Patent No.: US 11,976,584 B2
(45) Date of Patent: May 7, 2024

(54) VEHICLE HEAT EXCHANGER

(71) Applicant: Hanon Systems, Daejeon (KR)

(72) Inventors: Gwang Ok Ko, Daejeon (KR); Seong Woo Jeong, Daejeon (KR); Young Kook Hwang, Daejeon (KR); Hyuk Kim, Daejeon (KR); Dong Mi Jeong, Daejeon (KR)

(73) Assignee: Hanon Systems, Daejeon (KR)

(*) Notice: Subject to any disclaimer, the term of this patent is extended or adjusted under 35 U.S.C. 154(b) by 46 days.

(21) Appl. No.: 17/624,747

(22) PCT Filed: Jun. 15, 2020

(86) PCT No.: PCT/KR2020/007700
§ 371 (c)(1),
(2) Date: Jan. 4, 2022

(87) PCT Pub. No.: WO2021/006493
PCT Pub. Date: Jan. 14, 2021

(65) Prior Publication Data
US 2022/0235693 A1 Jul. 28, 2022

(30) Foreign Application Priority Data
Jul. 11, 2019 (KR) .................. 10-2019-0083575

(51) Int. Cl.
*F01P 11/10* (2006.01)
*B60K 11/04* (2006.01)
(Continued)

(52) U.S. Cl.
CPC ............... *F01P 11/10* (2013.01); *B60K 11/04* (2013.01); *F28D 1/05316* (2013.01);
(Continued)

(58) Field of Classification Search
CPC ........... B60H 1/00521; B60H 1/00535; B60K 11/04; F01P 3/18; F01P 11/10;
(Continued)

(56) References Cited

U.S. PATENT DOCUMENTS 4,306,615 A * 12/1981 Bolton .................... F28F 9/013
165/149
6,740,390 B2 * 5/2004 Randazzo .............. B60J 10/265
49/490.1
(Continued)

FOREIGN PATENT DOCUMENTS

DE        3538671 A1    5/1987
JP    2010007598 A    1/2010
(Continued)

OTHER PUBLICATIONS

Examination report issued on Dec. 4, 2023 by the German PTO in the corresponding Patent Application No. DE 11 2020 003 298.1, with English translation.

*Primary Examiner* — Eric S Ruppert
*Assistant Examiner* — Hans R Weiland
(74) *Attorney, Agent, or Firm* — Norton Rose Fulbright US LLP; James R. Crawford

(57) ABSTRACT

The present invention relates to a heat exchanger for a motor vehicle provided on the front surface of an engine room of the vehicle, and, more particularly, to a heat exchanger for a motor vehicle including a sealing member provided on the circumference of the heat exchanger in order to prevent driving-induced wind from leaking to the outside of the heat exchanger without passing through the heat exchanger.

12 Claims, 18 Drawing Sheets

(51) Int. Cl.
  *F28D 1/053*   (2006.01)
  *F28F 9/007*   (2006.01)
  *F01P 11/02*   (2006.01)
  *F28F 9/00*    (2006.01)

(52) U.S. Cl.
  CPC ....... *F28F 9/007* (2013.01); *F01P 2011/0228* (2013.01); *F01P 2070/52* (2013.01); *F28F 9/002* (2013.01); *F28F 2265/16* (2013.01)

(58) Field of Classification Search
  CPC ........... F01P 2011/0228; F01P 2070/52; F28D 1/05316; F28F 9/002; F28F 9/005; F28F 9/007; F28F 2265/16; F28F 2280/06
  See application file for complete search history.

(56) References Cited

U.S. PATENT DOCUMENTS

| | | | | |
|---|---|---|---|---|
| 2003/0051497 | A1* | 3/2003 | Nomura | B60H 1/00521 165/83 |
| 2009/0001675 | A1* | 1/2009 | Higashi | B60K 11/04 277/650 |
| 2009/0120610 | A1* | 5/2009 | Coyle | B60H 1/00521 165/67 |
| 2011/0005708 | A1* | 1/2011 | Seto | B60H 1/00064 165/41 |
| 2011/0232865 | A1 | 9/2011 | Mildner | |
| 2012/0048633 | A1* | 3/2012 | Williams | B60K 11/04 277/634 |
| 2015/0159961 | A1* | 6/2015 | Berndt | B60H 1/00521 165/173 |
| 2016/0009170 | A1 | 1/2016 | Schneider | |

FOREIGN PATENT DOCUMENTS

| | | |
|---|---|---|
| KR | 20120055940 A | 6/2012 |
| KR | 20170070341 A | 6/2017 |
| KR | 20180036116 A | 4/2018 |

* cited by examiner

VEHICLE HEAT EXCHANGER

CROSS REFERENCE TO RELATED APPLICATIONS

This application is a national phase under 35 U.S.C. § 371 of International Application No. PCT/KR2020/007700 filed on Jun. 15, 2020, which claims the benefit of priority from Korean Patent Application No. 10-2019-0083575 filed on Jul. 11, 2019. The entire contents of these applications are incorporated herein by reference in their entirety.

TECHNICAL FIELD

The present invention relates to a heat exchanger for a motor vehicle provided on the front surface of an engine room of the vehicle, and, more particularly, to a heat exchanger for a motor vehicle including a sealing member provided on the circumference of the heat exchanger in order to prevent driving-induced wind from leaking to the outside of the heat exchanger without passing through the heat exchanger.

BACKGROUND ART

In recent automobile development, methods for improving productivity by reducing the number of parts and processes are being studied. In this recent automobile development, among the methods for improving productivity, a technology of assembling a plurality of parts, respectively, to form an assembly in an assembly line, that is, modularization, is proposed. Among them, representative examples may include a modular front end module by assembling a cooling module including a radiator, a capacitor, and a fan/shroud, and a bumper including a headlamp and a bumper beam.

FIG. 1 is an exploded perspective view of a general front end module, and FIG. 2 is a perspective view of a general front end module. As illustrated, the front end module is modularized including a cooling module M that includes a radiator R, a capacitor C, and a fan shroud F in a cooling module mounting part 11 of the carrier 10 with the carrier 10 as a center thereof, headlamps mounted on both sides of the carrier 10 in a vehicle width direction, and a bumper beam mounted on the front surface of the carrier 10.

In this case, as an air guide 20 is formed in front of the carrier 10, a larger amount of air flows into the cooling module M by guiding the air flowing into the cooling module M from the outside during high-speed driving of the vehicle, and prevents the air discharged into an engine room through the cooling module M from re-introducing into the cooling module M when the vehicle is driving at low speed, thereby improving the heat dissipation performance of the capacitor C and the radiator R.

On the other hand, a gap G is generated in a coupling portion of the capacitor C and the air guide 20 as illustrated, and the driving-induced wind does not pass through the capacitor C and the radiator R, and degrades the heat exchange performance of the cooling module M when bypassed through the gap G.

Even in the case of a front end module in which an air guide is installed, since the heat exchange performance degrades when driving-induced wind exits through a circumference of a driving-induced wind inlet surface of the carrier and a circumference of the heat exchanger, it is required to develop a technology for preventing the driving-induced wind from leaking along the circumference of the heat exchanger.

DISCLOSURE

Technical Problem

The present invention provides a heat exchanger for a motor vehicle in which a sealing member is provided along a circumference of the heat exchanger to prevent driving-induced wind from leaking along the circumference of the heat exchanger.

In addition, the present invention provides a heat exchanger for a motor vehicle in which a sealing member includes a body made of a resin material, which is easily mounted on the heat exchanger, and a sealing part made of a rubber material that is coupled to the body and extends outward.

In particular, the present invention provides a heat exchanger for a motor vehicle in which a sealing part made of a rubber material extends to a front side of the vehicle to prevent the heat exchanger from sliding or separation when the heat exchanger is mounted on a carrier or when the air guide is attached to the heat exchanger.

In addition, the present invention provides a heat exchanger for a motor vehicle with improved a fixing force and sealing performance by configuring a sealing part made of a rubber material in multiple rows.

Technical Solution

According to the present invention, a heat exchanger for a motor vehicle coupled to an inner surface of a heat exchanger mounting part of a carrier or an air guide including a heat exchanger mounting part having an air inlet formed therein includes a sealing member configured to be disposed between a circumference of the heat exchanger and the heat exchanger mounting part to seal a coupling part between the heat exchanger and the heat exchanger mounting part.

The sealing member may include: a resin body configured to be coupled to the heat exchanger; and a sealing part made of a rubber material configured to have one end coupled to the body and the other end being in close contact with the heat exchanger mounting part.

The sealing part may be formed to allow the other end extending to the heat exchanger mounting part, and to inclinedly extend to a front side of the vehicle.

The sealing part may include: a first sealing part configured to have one end fixed to a front side of the vehicle on the body and the other end extending to the heat exchanger mounting part; and a second sealing part configured to have one end fixed to the first sealing part of the body on a rear side of the vehicle at a predetermined distance and the other end extending to the heat exchanger mounting part.

The first sealing part may be formed to allow the other end to extend to the heat exchanger mounting part, and to inclinedly extend to a front side of the vehicle, and the second sealing part is formed to allow the other end to extend to the heat exchanger mounting part, and to inclinedly extend to the rear side of the vehicle.

The first and second sealing parts may be formed to allow the other end to extend to the heat exchanger mounting part, and to inclinedly extend to the front side of the vehicle.

Inclinations of the first and second sealing parts may be 25 to 35° with respect to a horizontal plane.

The sealing part may have an annular cross section in a form that a pair of first and second sealing parts is disposed to be spaced apart along front and rear directions of the vehicle, and each one end portion and the other end portion are connected to each other.

The body may include a coupling groove recessed to be fitted into the protrusion of the heat exchanger.

The coupling groove formed in the body may be fitted into the protrusion of the support provided at a lower end of the heat exchanger.

The body may be integrally formed with at least one separation prevention protrusion protruding inward from an inner surface of the coupling groove.

The separation prevention protrusion may be formed to protrude from the inner surface of the coupling groove on the front side of the vehicle toward the rear side of the vehicle or from the inner surface of the coupling groove on the rear side of the vehicle toward the front side of the vehicle.

The separation prevention protrusion may be inclined in an opposite direction to a coupling direction of the heat exchanger as the separation prevention protrusion goes toward an end portion to facilitate coupling by elastic deformation during fitting of the heat exchanger, and prevent the heat exchanger from separating by an elastic restoring force after the coupling.

The heat exchanger may include a support for fixing the heat exchanger to a carrier of the vehicle, the body may be fitted into the support, and the support may be provided on an upper side or a lower side, or both the upper and lower sides of the heat exchanger.

Effect of the Invention

According to the present invention with the above configuration, a heat exchanger for a motor vehicle is configured to basically prevent driving-induced wind from leaking to an outside of a circumference of the heat exchanger through a sealing member and allow the driving-induced wind to pass through the heat exchanger, thereby improving the heat exchange performance of the heat exchanger.

In addition, a sealing member includes a body made of a resin material which is coupled to a heat exchanger, and a rubber sealing part extending outwardly from the body for sealing, thereby improving assembling performance of a sealing member and improving durability through firm fixation.

In addition, a sealing part is formed to extend to a front side of a vehicle to prevent deformation when assembling or due to driving-induced wind, thereby improving sealing performance.

In addition, a sealing part is configured in a plurality of rows, thereby improving a fixing force of a sealing member and also improving sealing performance.

DESCRIPTION OF REFERENCE SIGNS

Figure 1:
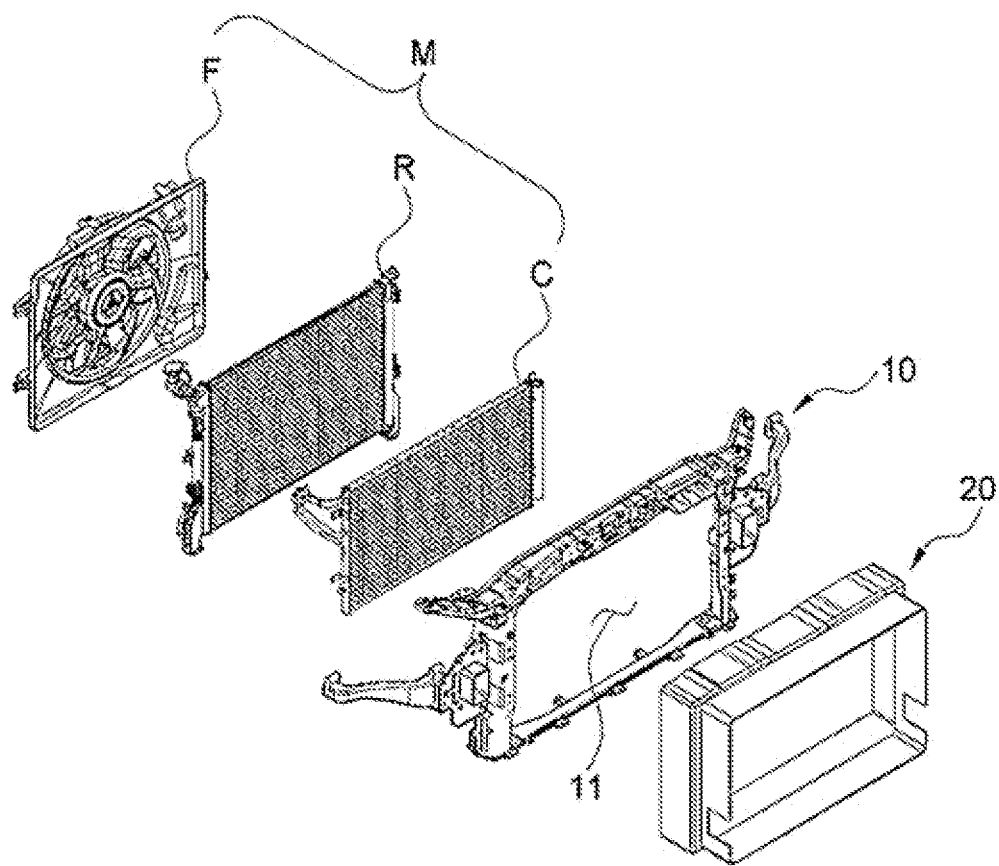
FIG. 1 is an exploded perspective view of a general front end module.
Figure 2:
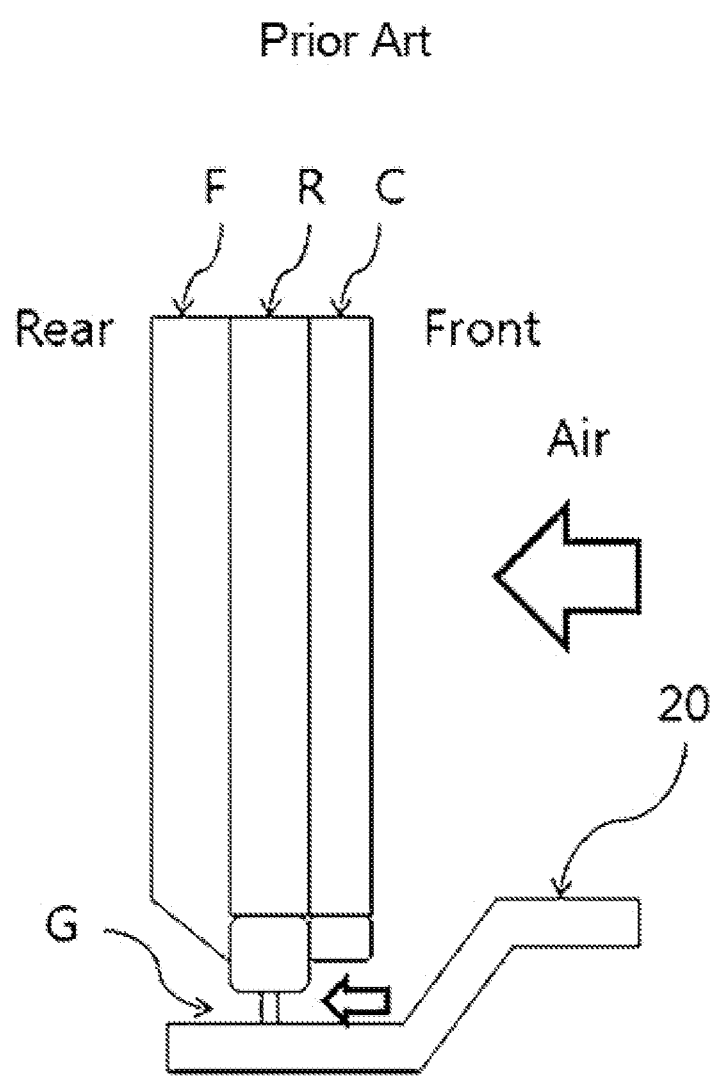
FIG. 2 is a schematic partial cross-sectional view of a conventional front end module.

FEM: Front end module
CR: Carrier
100: Heat exchanger
150, 150a, 150b, 150c: Support
151: Fastening part
152: Fastening protrusion
155: Fixed protrusion
200: Air guide
300, 400, 500, 600, 700, 800: Sealing member
310, 410, 510, 610, 710, 810: Body
320, 420, 520, 620, 720, 820: Sealing part
421, 521, 621: First sealing part
422, 522, 622: Second sealing part
815: Fixing part

BEST MODE

Hereinafter, before describing a heat exchanger for a motor vehicle of the present invention as described above, first, a front end module (FEM) that includes the heat exchanger for a motor vehicle according to an embodiment of the present invention will be described with reference to the accompanying drawings.

Figure 3:
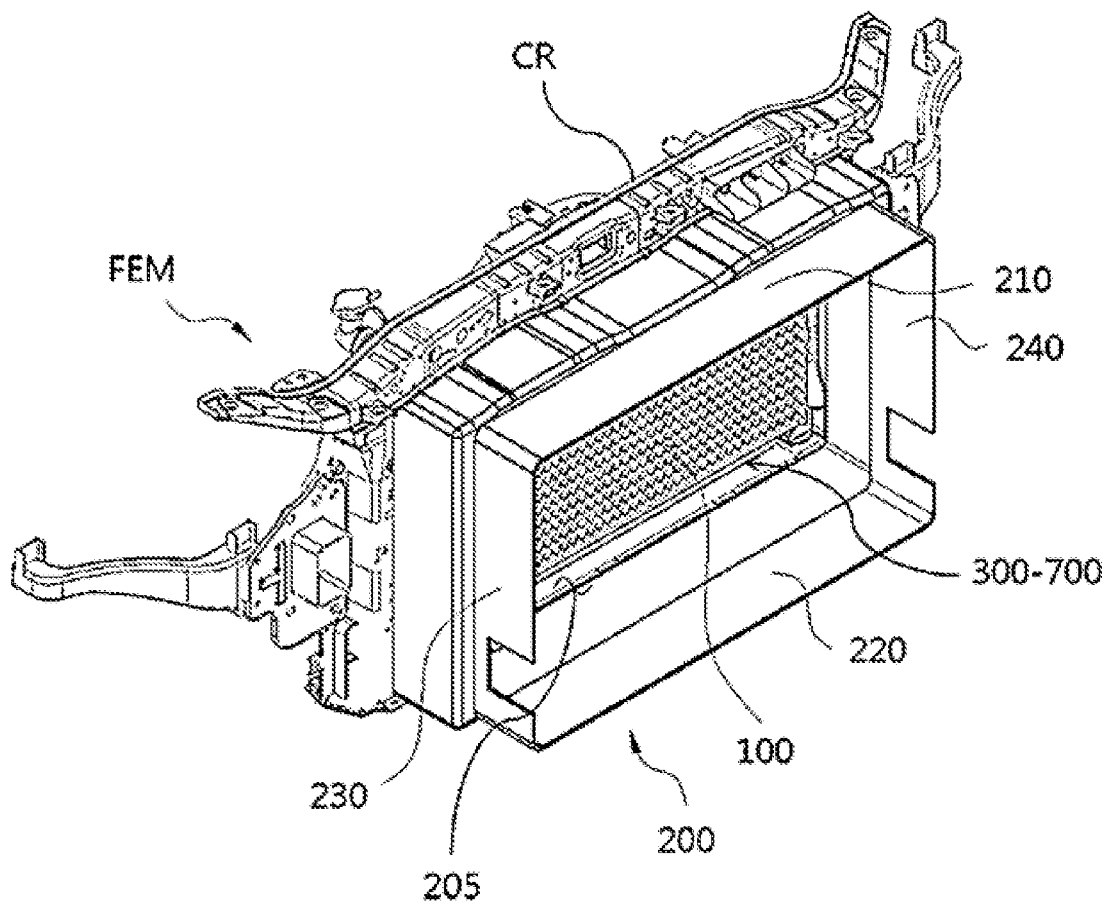
FIG. 3 is a perspective view of a front end module including a heat exchanger for a motor vehicle according to an embodiment of the present invention.

FIG. 3 illustrates a perspective view of the front end module (FEM) including a heat exchanger 100 for a motor vehicle according to an embodiment of the present invention. Typically, the front end module (FEM) includes a carrier, a heat exchanger, an air guide, a headlight, a bumper beam, and a bumper, but only the carrier, the heat exchanger and the air guide are illustrated in the drawings for convenience.

As illustrated, the front end module FEM includes a carrier CR on which the heat exchanger 100 such as a cooling module is mounted. The carrier CR includes a front panel that has a substantially rectangular frame shape for mounting the heat exchanger, and a support panel that is formed to extend to left and right sides of the front surface panel and is provided with a headlamp mounting part. In addition, an air guide 200 for guiding air and preventing backflow is formed in front of the front surface panel of the carrier CR.

The air guide 200 formed in front of the carrier CR guides air flowing in from the front toward the heat exchanger 100, and prevents air discharged to an engine room through the heat exchanger 100 from back-flowing toward the heat exchanger 100. In addition, the air guide 200 is configured to be separated and fixed to the carrier CR.

The air guide 200 may be configured to include an upper horizontal blade 210 formed in a horizontal direction on an upper side of the heat exchanger 100, a lower horizontal blade 220 formed in a horizontal direction on a lower side thereof, one vertical blade 230 formed in a vertical direction between one end portion of the upper horizontal blade 210 in a vehicle width direction and one end portion of the lower horizontal blade 220 in the vehicle width direction, and the other vertical blade 240 formed in the vertical direction between the other end portion of the upper horizontal blade 210 in the vehicle width direction and the other end portion of the lower horizontal blade 220 in the vehicle width direction.

In this case, a circumference portion of the heat exchanger 100 for a motor vehicle of the present invention is coupled to a heat exchanger mounting part 205 formed an inner surface of the air guide 200 on a rear side. In this case, sealing members 300, 400, 500, 600, and 700 are further included to seal a gap formed in a coupling portion of the heat exchanger 100 and the air guide 200. In the case of the front end module (FEM) without the air guide 200, the heat exchanger 100 may be coupled to the heat exchanger mounting part formed on the front panel of the carrier CR. In the drawing, the sealing members 300, 400, 500, 600, and 700 are shown to be provided only at a lower end portion of the heat exchanger 100 and an inner surface of a rear side of the lower horizontal blade 220 of the air guide 200, but may also be provided in a rear coupling portion of the upper horizontal blade 210, one vertical blade 230, and the other vertical blade 240.

The sealing members 300, 400, 500, 600, and 700 of the above configuration seals the gap formed between the circumference portion of the heat exchanger 100 and the heat exchanger mounting part 205 formed on the inner surface of the heat exchanger 100 to prevent driving-induced wind from leaking through the gap without passing through the heat exchanger.

Hereinafter, the heat exchanger 100 for a motor vehicle of the present invention including the sealing members 300, 400, 500, 600, and 700 according to various embodiments as described above will be described in detail with reference to the drawings.

First Embodiment (Basic Type)

Figure 4:
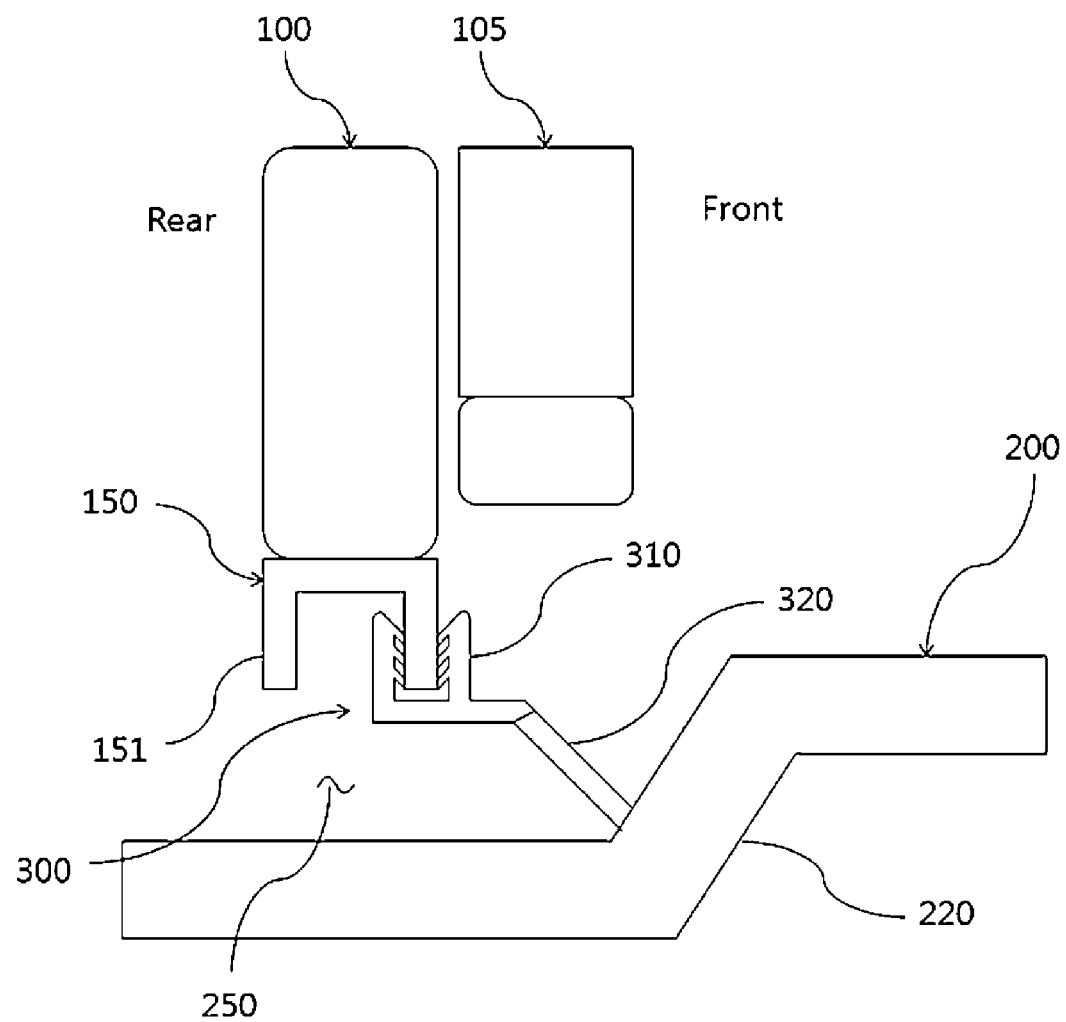
FIG. 4 is a schematic partial cross-sectional view illustrating a coupled state of the heat exchanger for a motor vehicle and an air guide according to a first embodiment of the present invention.
Figure 5:
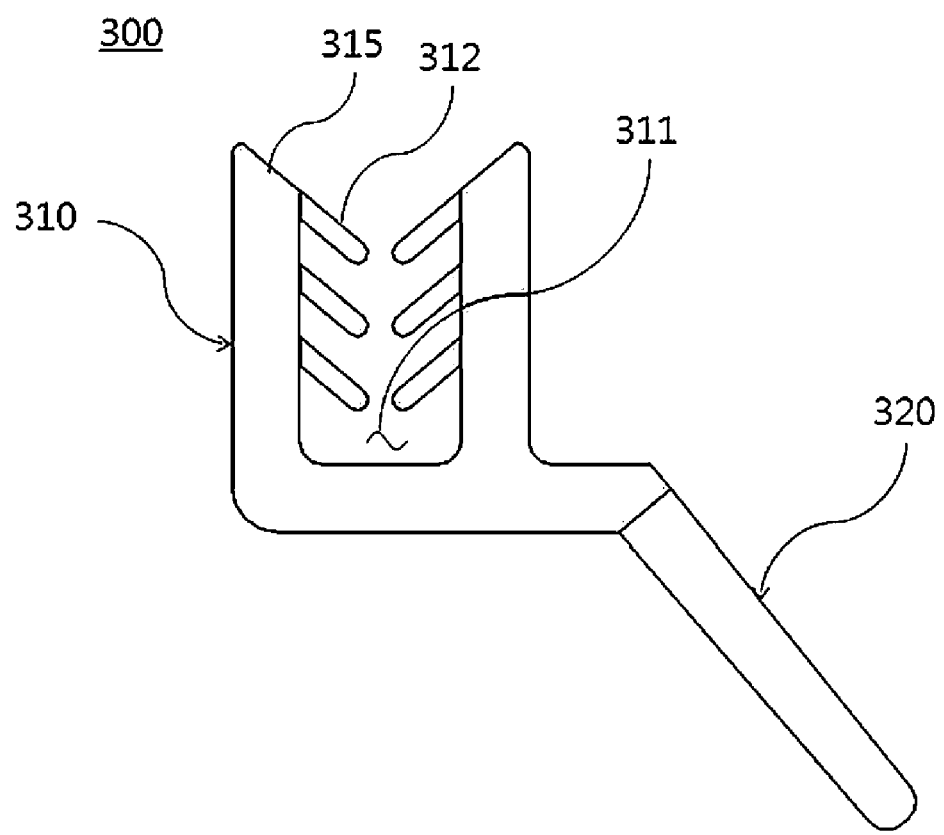
FIG. 5 is a side view of a sealing member of the heat exchanger for a motor vehicle according to the first embodiment of the present invention.

FIG. 4 is a schematic partial cross-sectional view illustrating a coupling structure of a heat exchanger 100 and an air guide 200 according to a first embodiment of the present invention, and FIG. 5 is a side view of a sealing member 300 according to the first embodiment of the present invention.

As illustrated, a support 150 for fixing the heat exchanger 100 to a carrier is provided at a lower end of the heat exchanger 100. The heat exchanger 100 may be, for example, a radiator for a vehicle. An additional heat exchanger 105 such as a capacitor for a vehicle may be provided in front of the heat exchanger 100 for a motor vehicle.

In this case, the heat exchanger 100 according to the first embodiment of the present invention includes a sealing member 300 that prevents driving-induced wind from leaking through a gap 250 formed between a lower end of the heat exchanger 100 and a lower horizontal blade 220 of the air guide 200. Accordingly, the sealing member 300 may be coupled to the lower end of the heat exchanger 100 and provided between the heat exchanger 100 and the air guide 200.

Specifically, the sealing member 300 may include a body 310 fitted into a protrusion 151 of a support 150 provided at the lower end of the heat exchanger 100, and a sealing part 320 extending from the body 310 and sealing a coupling part between the heat exchanger 100 of the air guide 200. The body 310 may be made of a resin material for firmly coupling with the heat exchanger 100, and the sealing part 320 may be made of a rubber material to firmly seal the gap 250 between the heat exchanger 100 and the air guide 200. Therefore, the sealing member 300 may be manufactured in a double injection type that is easy to mold different materials.

Hereinafter, the detailed shape and configuration of the sealing member 300 according to the above-described first embodiment will be described in detail with reference to the drawings.

Referring to FIG. 5, the sealing member 300 includes the body 310 fitted into the heat exchanger 100, and the sealing part 320 for sealing a coupling portion between the heat exchanger 100 and the air guide 200 by being coupled to the lower end of the heat exchanger 100.

The body 310 includes a coupling groove 311 recessed downward from above so that the protrusion 151 of the support 150 is fitted, and a separation prevention protrusion 312, which prevents separation when fitting into the support 150, provided on an inner surface of the coupling groove 311.

An upper end portion of the body 310 includes an inclined part 315 formed to be inclined toward the coupling groove 311 as it goes downward to guide the support 150 to the coupling groove 311 when coupled with the support 150.

The separation prevention protrusion 312 may be made of the same or similar rubber material as the sealing part 320. The separation prevention protrusion 312 may be integrally molded by a double injection or extrusion method when the body 310 is molded. The support 150 may be formed along the vehicle width direction to correspond to the lower end portion of the heat exchanger 100. A cross section of the support 150 is configured to be 'U'-shaped, with an opened portion facing downward. The coupling groove 311 may be continuously formed along the vehicle width direction to correspond to the support 150. The coupling groove 311 is configured to be fitted into the protrusion 151 formed on the front side of the vehicle among the pair of protrusions.

A plurality of separation prevention protrusions 312 are disposed to be spaced apart in the vertical direction. The separation prevention protrusion 312 may be formed to protrude inward from the inner surface of the coupling groove 311. More specifically, the separation prevention protrusion 312 may be formed to protrude from the inner surface of the coupling groove 311 on the front side of the vehicle toward the rear side of the vehicle, and may be formed to protrude from the inner surface of the coupling groove 311 on the rear side of the vehicle toward the front side of the vehicle. The separation prevention protrusions 312 may be continuously formed in the vehicle width direction or may be formed to be spaced apart from each other at regular intervals. In addition, the separation prevention protrusion 312 may inclinedly extend to have a predetermined inclination in the opposite direction to which the body 310 is coupled, that is, downward. This facilitates the fitting of the support 150 through bending deformation when the body 310 is inserted, and after the support 150 is coupled, prevents the support 150 from separating from the body 310 by a friction force and an elastic restoring force.

The sealing part 320 is formed to extend downward from the lower end of the body 310 on the front side of the vehicle. The sealing part 320 is formed to have a certain inclination toward the front side when extending downward. That is, the sealing part is formed to extend in a direction opposite to the flow direction of the driving-induced wind, and thus, the sealing part 320 is deformed by the driving-induced wind to prevent leakage from occurring.

The inclination of the sealing part 320 may be about 25 to 35° with respect to the horizontal plane. This is because, when the inclination is less than 25°, the sealing performance deteriorates, and when the inclination exceeds 35°, deformation due to driving-induced wind may occur.

Figure 18:
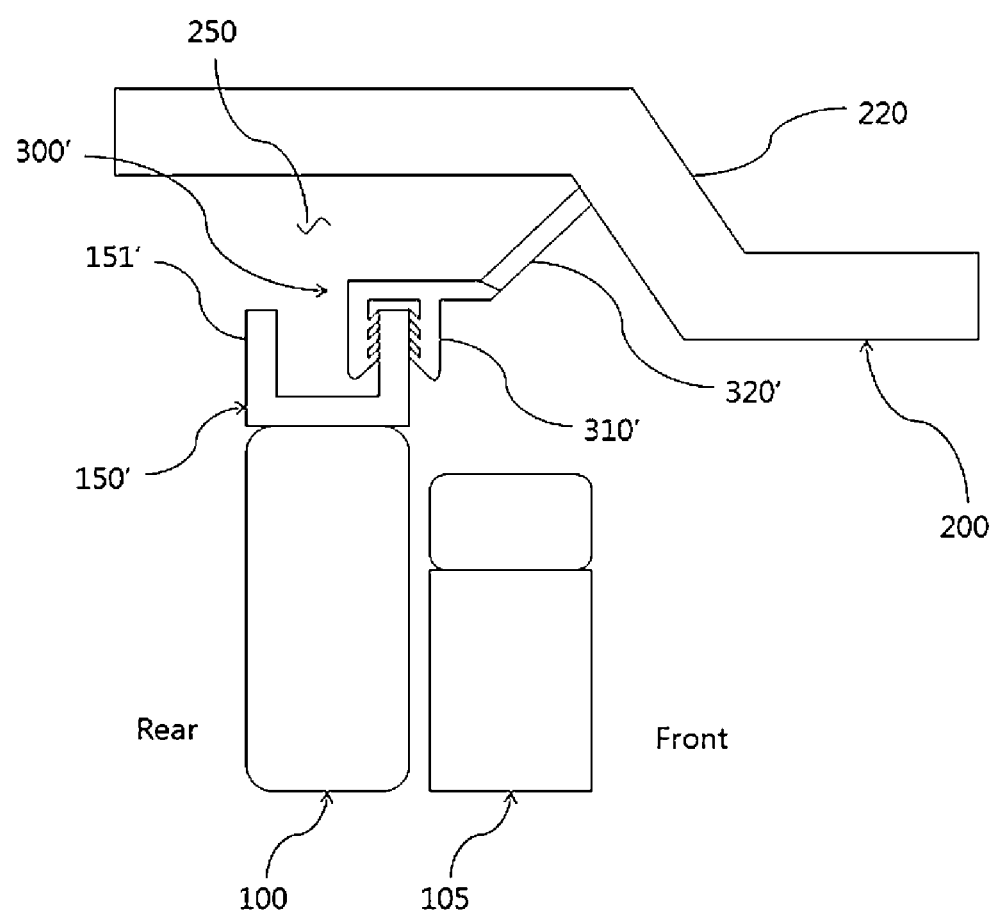
FIG. 18 is a schematic partial cross-sectional view (upper side of the heat exchanger) illustrating a coupled state of the heat exchanger for a motor vehicle and the air guide according to the first embodiment of the present invention.

The coupling structure of the heat exchanger 100 and the sealing part 320 is applicable to the support provided on the upper side of the heat exchanger 100. Referring to FIG. 18, a protrusion 151' of a support 150' protrudes upward, and a sealing member 300' is formed symmetrically with the above-described sealing member 300 to be coupled to the protrusion 151'. Accordingly, the sealing members 300 and 300' may be provided on the lower side or the upper side of the heat exchanger 100, or both the lower side and the upper side thereof.

Second Embodiment (Two-Row Sealing Type)

Figure 6:
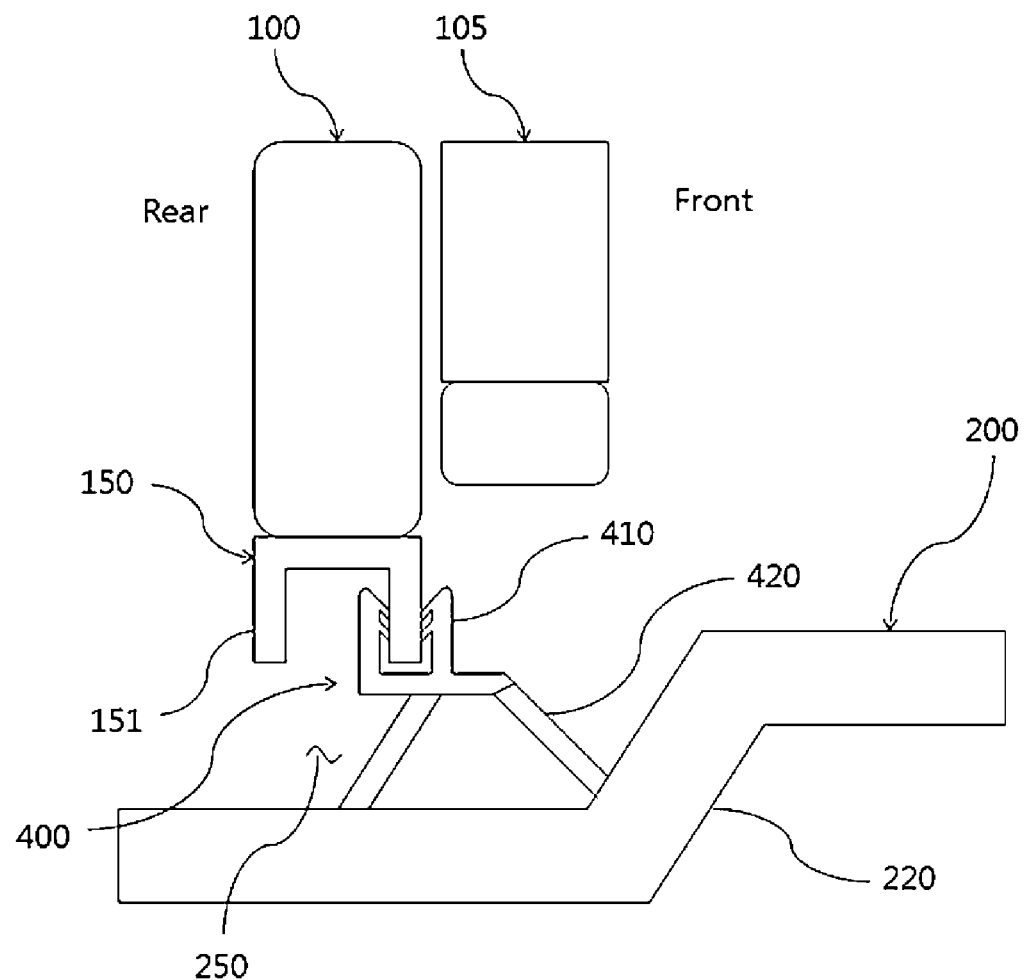
FIG. 6 is a schematic partial cross-sectional view illustrating a coupled state of a heat exchanger for a motor vehicle and an air guide according to a second embodiment of the present invention.
Figure 7:
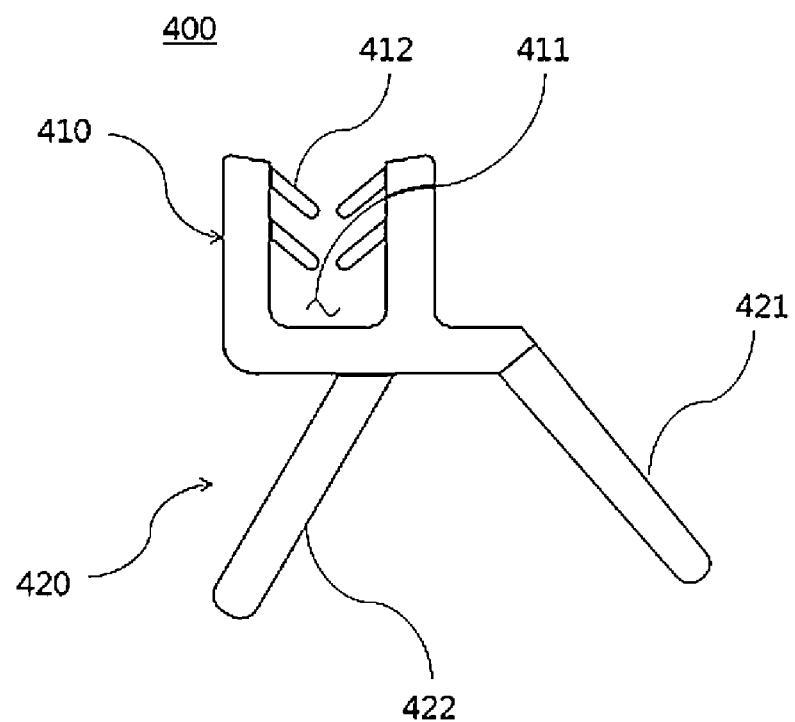
FIG. 7 is a side view of a sealing member of the heat exchanger for a motor vehicle according to the second embodiment of the present invention.

FIG. 6 is a schematic partial cross-sectional view illustrating a coupling structure of a heat exchanger 100 and an air guide 200 according to a second embodiment of the present invention, and FIG. 7 is a side view of a sealing member 400 according to the second embodiment of the present invention.

As illustrated, a support 150 for fixing the heat exchanger 100 to a carrier is provided at a lower end of the heat exchanger 100. The heat exchanger 100 may be, for example, a radiator for a vehicle. An additional heat exchanger 105 such as a capacitor for a vehicle may be provided in front of the heat exchanger 100 for a motor vehicle.

In this case, in the heat exchanger 100 according to the second embodiment of the present invention includes a sealing member 400 that prevents driving-induced wind from leaking through a gap 250 formed between a lower end of the heat exchanger 100 and a lower horizontal blade 220 of the air guide 200. Accordingly, the sealing member 400 may be coupled to the lower end of the heat exchanger 100 and provided between the heat exchanger 100 and the air guide 200.

Specifically, the sealing member 400 may include a body 410 fitted to a protrusion 151 of a support 150 provided at the lower end of the heat exchanger 100, and a sealing part 420 extending from the body 410 and sealing a coupling part between the heat exchanger 100 and the air guide 200. The body 410 may be made of a resin material for firmly coupling with the heat exchanger 100, and the sealing part 420 may be made of a rubber material to firmly seal the gap 250 between the heat exchanger 100 and the air guide 200. Therefore, the sealing member 300 may be manufactured in a double injection type that is easy to mold different materials.

Hereinafter, the detailed shape and configuration of the sealing member 400 according to the above-described first embodiment will be described in detail with reference to the drawings.

Referring to FIG. 7, the sealing member 400 includes the body 410 fitted to the heat exchanger 100, and the sealing part 420 for sealing a coupling portion between the heat exchanger 100 and the air guide 200 by being coupled to the lower end of the heat exchanger 100.

The body 410 includes a coupling groove 411 recessed downward from above so that the protrusion 151 of the support 150 is fitted, and a separation prevention protrusion 412, which prevents separation when fitting into the support 150, provided on an inner surface of the coupling groove 411. The separation prevention protrusion 412 may be made of the same or similar rubber material as the sealing part 420. The separation prevention protrusion 412 may be integrally molded by a double injection or extrusion method when the body 410 is molded. A plurality of separation prevention protrusions 412 are disposed to be spaced apart in the vertical direction, and may basically extend in a lateral direction as an extension direction, but may extend to have a predetermined inclination in the opposite direction to which the body 410 is coupled, that is, downward.

The sealing part 420 includes a first sealing part 421 extending downward from the front side of the vehicle on a lower end of the body 410 and a second sealing part 422 extending downward from a center side on the lower end of the body 410. That is, the sealing part 420 has a two-row structure, so that, when the air guide 200 is coupled to the heat exchanger 100, assembly performance may be improved, and sealing performance may be improved by minimizing deformation of the sealing part 420 when coupled.

In addition, the first sealing part 421 is formed to have a certain inclination toward the front side when extending downward. That is, the sealing part is formed to extend in a direction opposite to the flow direction of the driving-induced wind, and thus, the first sealing part 421 is deformed by the driving-induced wind to prevent leakage from occurring.

In addition, the second sealing part 422 is formed to have a certain inclination toward the rear side when extending downward. This improves assembly stability when the air guide 200 is coupled and makes the sealing part 420 form a symmetrical structure to improve fixing stability.

The inclination of the first and second sealing parts 421 and 422 may be about 25 to 35° with respect to the horizontal plane. This is because, when the inclination is less than 25°, the sealing performance deteriorates, and when the inclination exceeds 35°, deformation due to driving-induced wind may occur.

Third Embodiment (Two-Row Symmetrical Sealing Type)

Figure 8:
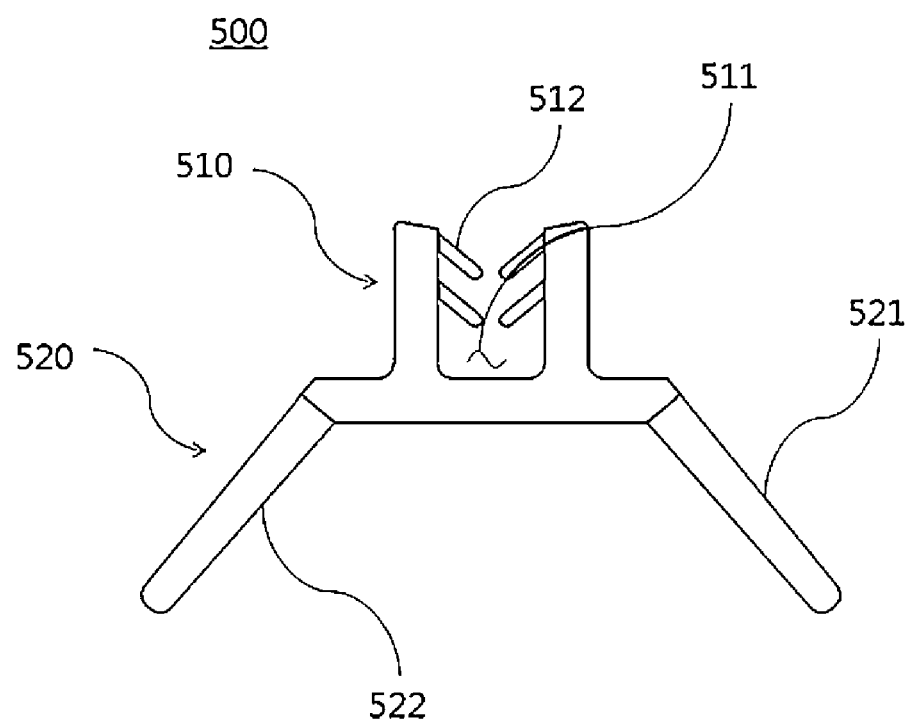
FIG. 8 is a side view of a sealing member of a heat exchanger for a motor vehicle according to a third embodiment of the present invention.

Referring to FIG. 8, the sealing member 500 includes the body 510 fitted to the heat exchanger 100, and the sealing part 520 for sealing a coupling portion between the heat exchanger 100 and the air guide 200 by being coupled to the lower end of the heat exchanger 100.

The body 510 includes a coupling groove 511 recessed downward from above so that the protrusion 151 of the support 150 is fitted, and a separation prevention protrusion 512, which prevents separation when fitting into the support 150, provided on an inner surface of the coupling groove 511. The separation prevention protrusion 512 may be made of the same or similar rubber material as the sealing part 520. The separation prevention protrusion 512 may be integrally molded by a double injection or extrusion method when the body 510 is molded.

The sealing part 520 includes a first sealing part 521 extending downward from an end portion of the front side of the vehicle on a lower end of the body 510 and a second sealing part 522 extending downward from an end portion of the rear side of the vehicle on the lower end of the body 510.

In this case, the first sealing part 521 is formed to have a certain inclination toward the front side when extending downward. That is, the sealing part is formed to extend in a direction opposite to the flow direction of the driving-induced wind, and thus, the first sealing part 521 is deformed by the driving-induced wind to prevent leakage from occurring.

In addition, the second sealing part 522 is formed to have a certain inclination toward the rear side when extending downward. This improves assembly stability when the air guide 200 is coupled and makes the sealing part 520 form a symmetrical structure to improve fixing stability.

The sealing member 500 of the third embodiment has a more perfect symmetrical structure than the sealing member 400 of the second embodiment described above, and therefore, has the advantage that the sealing member 500 may be more stably fixed between the heat exchanger 100 and the air guide 200.

Fourth Embodiment (Two-Row Leakage Prevention Type)

Figure 9:
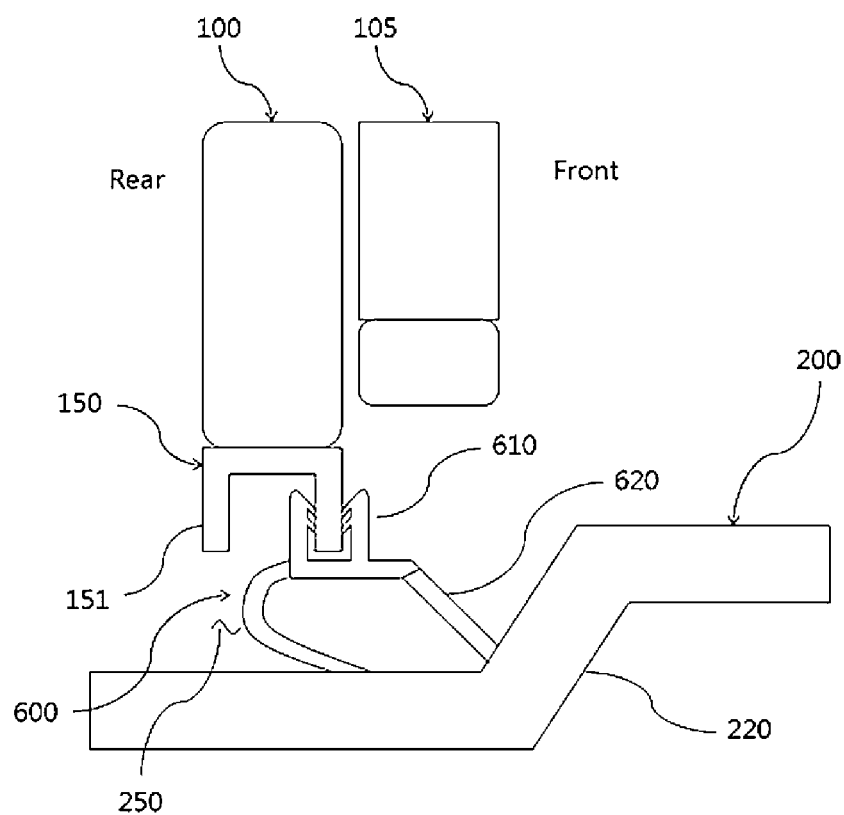
FIG. 9 is a schematic partial cross-sectional view illustrating a coupled state of a heat exchanger for motor vehicle and an air guide according to a fourth embodiment of the present invention.
Figure 10:
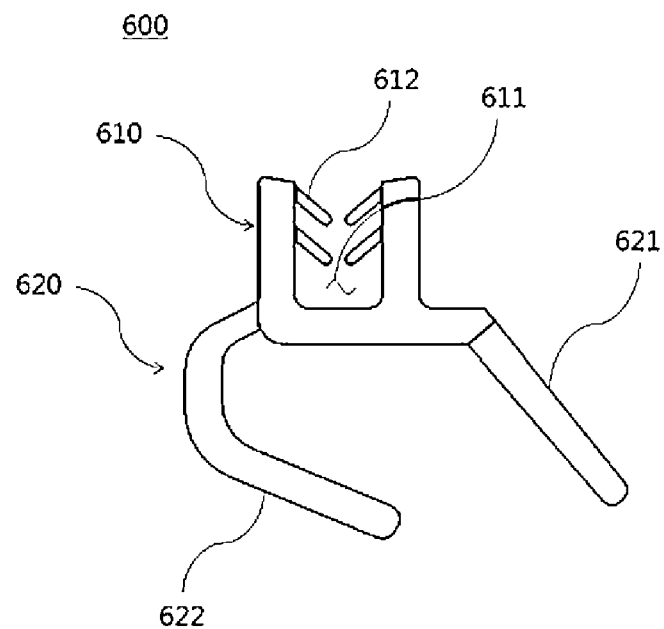
FIG. 10 is a side view of a sealing member of the heat exchanger for a motor vehicle according to the fourth embodiment of the present invention.

FIG. 9 is a schematic partial cross-sectional view illustrating a coupling structure of a heat exchanger 100 and an air guide 200 according to a fourth embodiment of the present invention, and FIG. 10 is a side view of a sealing member 600 according to the fourth embodiment of the present invention.

As illustrated, a support 150 for fixing the heat exchanger 100 to a carrier is provided at a lower end of the heat exchanger 100. The heat exchanger 100 may be, for example, a radiator for a vehicle. An additional heat exchanger 105 such as a capacitor for a vehicle may be provided in front of the heat exchanger 100 for a motor vehicle.

In this case, the sealing member 600 may include a body 610 fitted to a protrusion 151 of a support 150 provided at the lower end of the heat exchanger 100, the heat exchanger 100 extending from the body 610, and a sealing part 620 extending from the body 610 and sealing a coupling part between the heat exchanger 100 and the air guide 200.

Referring to FIG. 10, the body 610 includes a coupling groove 611 recessed downward from above so that the protrusion 151 of the support 150 is fitted, and a separation prevention protrusion 612, which prevents separation when fitting into the support 150, provided on an inner surface of the coupling groove 611. The separation prevention protrusion 612 may be made of the same or similar rubber material as the sealing part 620. The separation prevention protrusion 612 may be integrally molded by a double injection or extrusion method when the body 610 is molded. A plurality of separation prevention protrusions 612 are disposed to be spaced apart in the vertical direction, and may basically extend in a lateral direction as an extension direction, but may extend to have a predetermined inclination in the opposite direction to which the body 610 is coupled, that is, downward.

The sealing part 620 includes a first sealing part 621 extending downward from the front side of the vehicle on a lower end of the body 610 and a second sealing part 622 extending downward from a center side on the lower end of the body 610. That is, the sealing part 620 has a two-row structure, so that, when the air guide 200 is coupled to the heat exchanger 100, assembly performance may be improved, and sealing performance may be improved by minimizing deformation of the sealing part 620 when coupled.

In addition, the first sealing part 621 is formed to have a certain inclination toward the front side when extending downward. That is, the sealing part is formed to extend in a direction opposite to the flow direction of the driving-induced wind, and thus, the first sealing part 621 is deformed by the driving-induced wind to prevent leakage from occurring.

In addition, the second sealing part 622 is also formed to have a certain inclination toward the front side when extending downward. Accordingly, as each of the two-row sealing parts is formed to be inclined toward the front side of the vehicle, the first and second sealing parts 621 and 622 are deformed by the driving-induced wind, thereby further preventing leakage from occurring.

Fifth Embodiment (Two-Row Contact Area Increasing Type)

Figure 11:
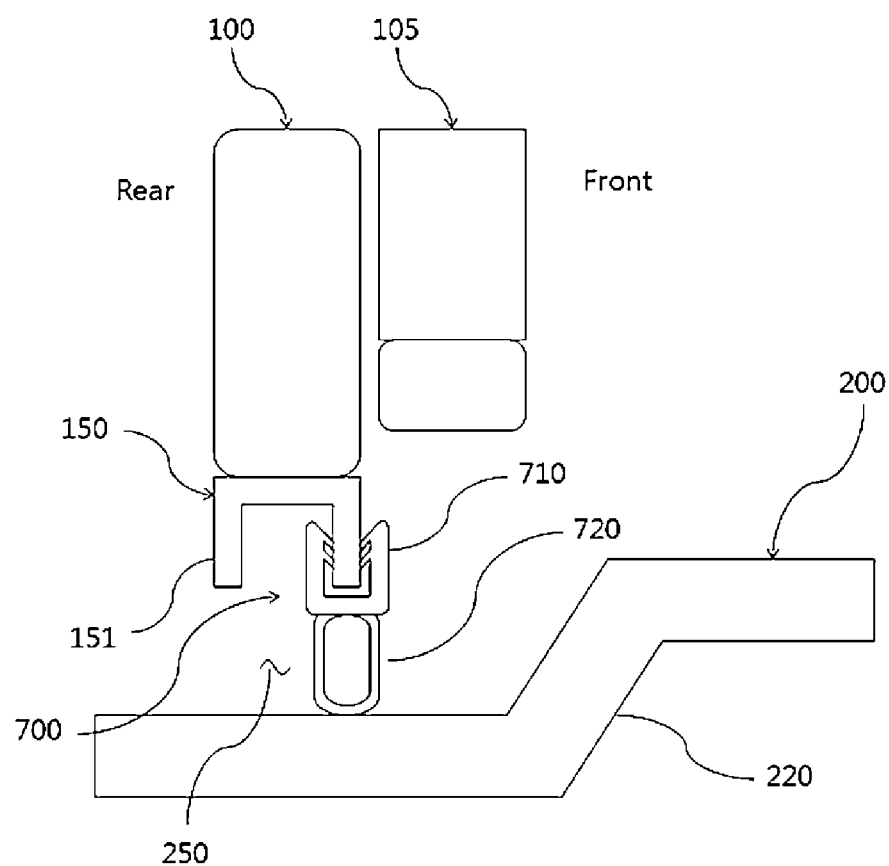
FIG. 11 is a schematic partial cross-sectional view illustrating a coupled state of a heat exchanger for a motor vehicle and an air guide according to a fifth embodiment of the present invention.
Figure 12:
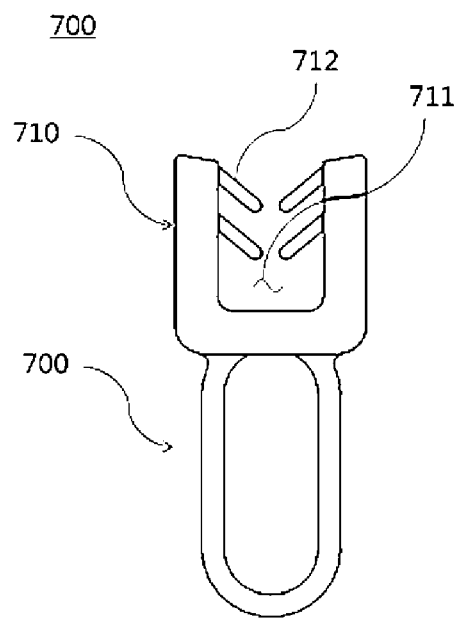
FIG. 12 is a side view of a sealing member of the heat exchanger for a motor vehicle according to the fifth embodiment of the present invention.

FIG. 11 is a schematic partial cross-sectional view illustrating a coupling structure of a heat exchanger 100 and an air guide 200 according to a fifth embodiment of the present invention, and FIG. 12 is a side view of a sealing member 700 according to the fifth embodiment of the present invention.

The sealing member 700 according to the fifth embodiment of the present may include a body 710 fitted to a protrusion 151 of a support 150 provided at the lower end of the heat exchanger 100, and a sealing part 720 extending from the body 710 and sealing a coupling part between the heat exchanger 100 and the air guide 200.

Referring to FIG. 12, the body 710 includes a coupling groove 711 recessed downward from above so that the protrusion 151 of the support 150 is fitted, and a separation prevention protrusion 712, which prevents separation when fitting into the support 150, provided on an inner surface of the coupling groove 711. The separation prevention protrusion 712 may be made of the same or similar rubber material as the sealing part 720. The separation prevention protrusion 712 may be integrally molded by a double injection or extrusion method when the body 710 is molded. A plurality of separation prevention protrusions 712 are disposed to be spaced apart in the vertical direction, and may basically extend in a lateral direction as an extension direction, but may extend to have a predetermined inclination in the opposite direction to which the body 710 is coupled, that is, downward.

The sealing part 720 is formed to extend downward on the lower end of the body 710. In this case, the sealing parts 720 are formed in the form of two rows extending downward from the front and rear sides of the vehicle, and the lower ends thereof are connected to each other. For example, the sealing part 720 may be formed in an annular shape extending along a longitudinal direction. In the case where the sealing part 720 is formed in the annular shape, when the air guide 200 is coupled to the heat exchanger 100, the friction force is reduced to improve assembly performance, and when coupled, the contact area between the lower end of the sealing part 720 and the air guide 200 may be increased to improve sealing performance.

Sixth Embodiment (Support Fastening Part Recessed Type)

Figure 13:
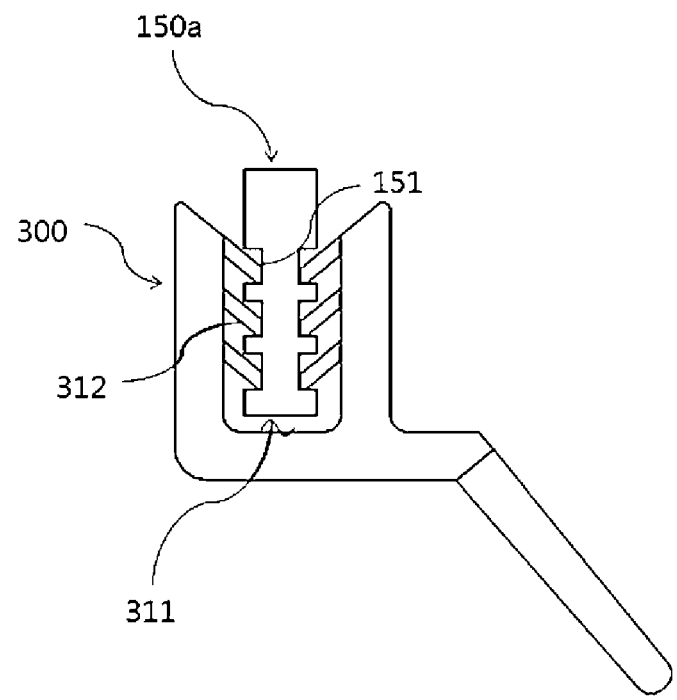
FIG. 13 is a coupled cross-sectional view of a support and a sealing member of a heat exchanger for a motor vehicle according to a sixth embodiment of the present invention.

FIG. 13 is a schematic cross-sectional view illustrating a coupling structure of a support 150a and a sealing member 300 of a heat exchanger according to a sixth embodiment of the present invention.

Although the configuration of the sealing member 300 according to the first embodiment is described in the drawings, the sealing member of other embodiments is also applicable.

The sealing member 300 includes a body 310 and a sealing part 320 as described above, and the body 310 is provided with a separation prevention protrusion 312. The support 150a may be formed along a vehicle width direction to correspond to a lower end portion of the heat exchanger 100. A coupling groove 311 of the body 310 may be continuously formed along the vehicle width direction to correspond to the support 150a.

A plurality of separation prevention protrusions 312 are disposed to be spaced apart in the vertical direction. The separation prevention protrusion 312 may be formed to protrude inward from an inner surface of the coupling groove 311. More specifically, the separation prevention protrusion 312 may be formed to protrude from the inner surface of the coupling groove 311 on the front side of the vehicle toward the rear side of the vehicle, and may be formed to protrude from the inner surface of the coupling groove 311 on the rear side of the vehicle toward the front side of the vehicle. The separation prevention protrusions 312 may be continuously formed in the vehicle width direction or may be formed to be spaced apart from each other at regular intervals. In addition, the separation prevention protrusion 312 may inclinedly extend to have a predetermined inclination in the opposite direction to which the body 310 is coupled, that is, downward. This facilitates the fitting of the support 150a through bending deformation when the body 310 is inserted, and after the support 150a is coupled, prevents the support 150a from separating from the body 310 by a friction force and an elastic restoring force.

In this case, the separation prevention protrusion 312 is configured to further include a fastening part 151 recessed inward from the outer surface of the support 150a so that the end portion of the separation prevention protrusion 312 is inserted after the body 310 is inserted on the support 150a. The fastening part 151 may be formed in the form of a groove or may be formed in the form of a hole. In addition, the separation prevention protrusion 312 may be formed in the form of a slot along the vehicle width direction. The fastening part 151 may be formed to be recessed from an outer surface of the front side of the vehicle toward the rear side of the vehicle or from an outer surface of the vehicle toward the front side of the vehicle. In addition, the fastening part 151 may be formed on both the outer surfaces of the front and rear sides of the vehicle. As described above, through the configuration of the fastening part 151, the end portion of the separation prevention protrusion 312 may be configured to be inserted to further improve an adhesion force of the support 150a and the sealing member 300.

Seventh Embodiment (Support Fastening Protrusion Type)

Figure 14:
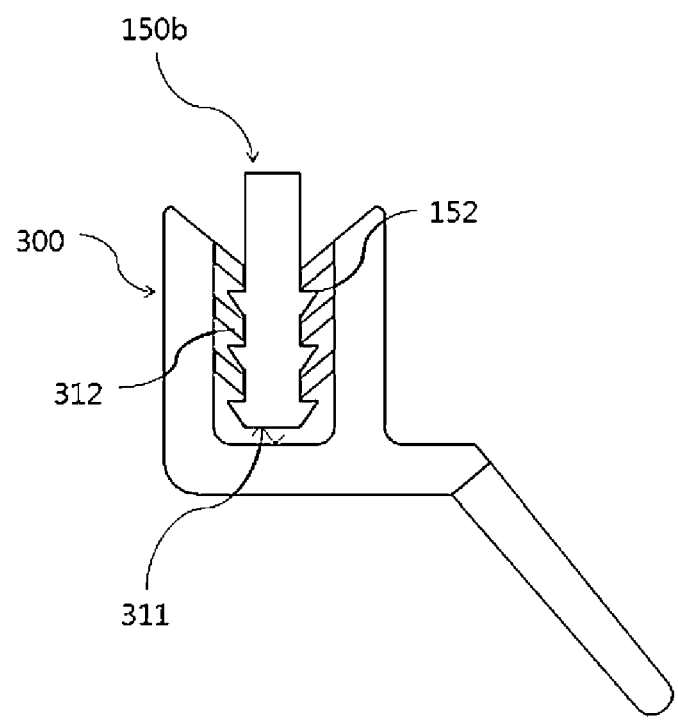
FIG. 14 is a coupled cross-sectional view of a support and a sealing member of a heat exchanger for a motor vehicle according to a seventh embodiment of the present invention.

FIG. 14 is a schematic cross-sectional view illustrating a coupling structure of a support 150b and a sealing member 300 of a heat exchanger according to a seventh embodiment of the present invention.

Although the configuration of the sealing member 300 according to the first embodiment is described in the drawings, the sealing member of other embodiments is also applicable.

The sealing member 300 includes a body 310 and a sealing part 320 as described above, and the body 310 is provided with a separation prevention protrusion 312. The support 150b may be formed along a vehicle width direction to correspond to a lower end portion of the heat exchanger 100. A coupling groove 311 of the body 310 may be continuously formed along the vehicle width direction to correspond to the support 150b.

A plurality of separation prevention protrusions 312 are disposed to be spaced apart in the vertical direction. The separation prevention protrusion 312 may be formed to protrude inward from an inner surface of the coupling groove 311. More specifically, the separation prevention protrusion 312 may be formed to protrude from the inner surface of the coupling groove 311 on the front side of the vehicle toward the rear side of the vehicle, and may be formed to protrude from the inner surface of the coupling groove 311 on the rear side of the vehicle toward the front side of the vehicle. The separation prevention protrusions 312 may be continuously formed in the vehicle width direction or may be formed to be spaced apart from each other at regular intervals. In addition, the separation prevention protrusion 312 may inclinedly extend to have a predetermined inclination in the opposite direction to which the body 310 is coupled, that is, downward. This facilitates the fitting of the support 150b through bending deformation when the body 310 is inserted, and after the support 150b is coupled, prevents the support 150b from separating from the body 310 by a friction force and an elastic restoring force.

In this case, the separation prevention protrusion 312 is configured to further include a fastening protrusion 152 protruding outward from the outer surface of the body 310 so that the end portion of the separation prevention protrusion 312 is engaged after the body 310 is inserted on the support 150b. As long as the fastening protrusion 152 has a configuration that may be engaged with the end portion of the separation prevention protrusion 312, a shape of the fastening protrusion 152 is not limited, and the fastening protrusion 152 may be a hook-type protrusion as an example. The fastening protrusion 152 may be formed to protruding from an outer surface of the front side of the vehicle toward the front side of the vehicle or from an outer surface of the rear side of the vehicle toward the rear side of the vehicle. In addition, the fastening protrusion 151 may be formed on both the outer surfaces of the front and rear sides of the vehicle. As described above, through the configuration of the fastening protrusion 152, the end portion of the separation prevention protrusion 312 may be configured to be engaged to further improve an adhesion force of the support 150b and the sealing member 300.

Eighth Embodiment (Support and Body Fixing Type)

Figure 15:
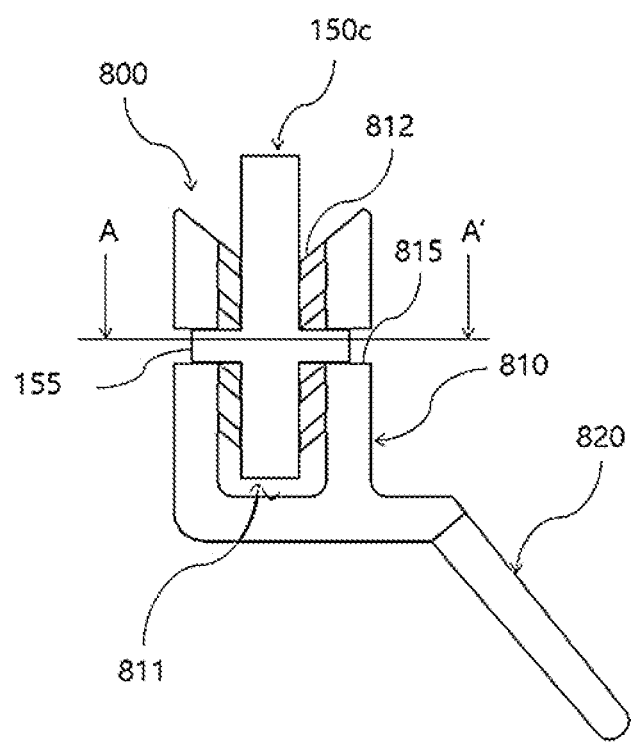
FIG. 15 is a coupled cross-sectional view of a support and a sealing member of a heat exchanger for a motor vehicle according to an eighth embodiment of the present invention.
Figure 16:
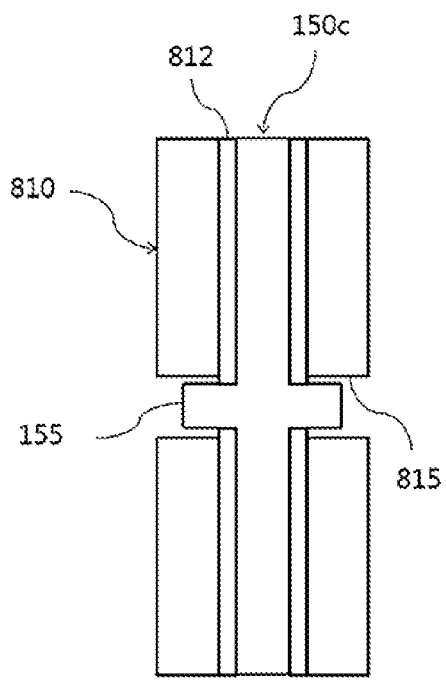
FIG. 16 is a transversal cross-sectional view (cross section taken along AA') of FIG. 15.
Figure 17:
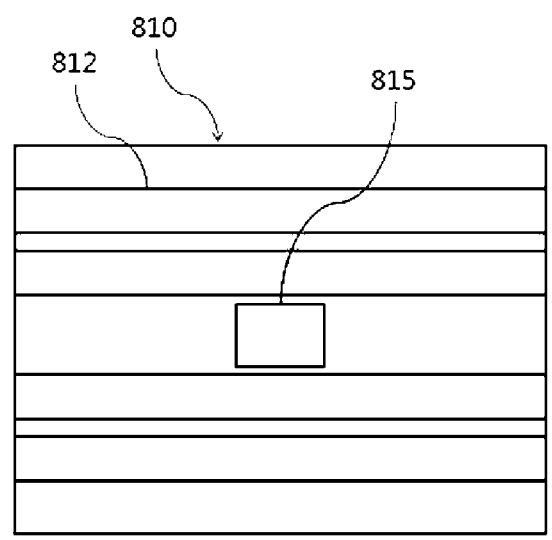
FIG. 17 is a front view of an inside of a sealing member of the heat exchanger for a motor vehicle according to the eighth embodiment of the present invention.

FIG. 15 is a schematic cross-sectional view illustrating a coupling structure of a support 150c and a sealing member 800 of a heat exchanger according to an eighth embodiment of the present invention.

The sealing member 800 includes a body 810 and a sealing part 820 as described above, and the body 810 is provided with a separation prevention protrusion 812. The support 150c may be formed along a vehicle width direction to correspond to a lower end portion of the heat exchanger 100. A coupling groove 811 of the body 810 may be continuously formed along the vehicle width direction to correspond to the support 150c.

A plurality of separation prevention protrusions 812 are disposed to be spaced apart in the vertical direction. The separation prevention protrusion 812 may be formed to protrude inward from an inner surface of the coupling groove 811. More specifically, the separation prevention protrusion 812 may be formed to protrude from the inner surface of the coupling groove 811 on the front side of the vehicle toward the rear side of the vehicle, and may be formed to protrude from the inner surface of the coupling groove 811 on the rear side of the vehicle toward the front side of the vehicle. The separation prevention protrusions 812 may be continuously formed in the vehicle width direction or may be formed to be spaced apart from each other at regular intervals. In addition, the separation prevention protrusion 812 may inclinedly extend to have a predetermined inclination in the opposite direction to which the body 810 is coupled, that is, downward. This facilitates the fitting of the support 150c through bending deformation when the body 810 is inserted, and after the support 150c is coupled, prevents the support 150c from separating from the body 810 by a friction force and an elastic restoring force.

In this case, after the body 810 is inserted on the support 150c, the separation prevention protrusion 812 is configured to further include a fixed protrusion 155 protruding outward from the outer surface of the body 810 to be fitted into a fixing part 815 formed on the body 810. A shape of the fixed protrusion 155 is not limited as long as it is a configuration that may be fitted into the fixing part 815. The fastening protrusion 155 may be formed to protrude from an outer surface of the front side of the vehicle toward the rear side of the vehicle or from an outer surface of the rear side of the vehicle toward the rear side of the vehicle. In addition, the fastening protrusion 155 may be formed on both the outer surfaces of the front and rear sides of the vehicle. The fixing part 815 is formed on the inner surface of the body 810, and is configured in the form of a groove or a hole so that the fixed protrusion 155 may be fitted when the sealing member 800 is coupled to the support 150c. As described above, through the configuration of the fixing protrusion 155 and the fixing part 815, the support 150c is configured so that it may be engaged with the body 810 of the sealing member 800, thereby further improving an adhesion force of the support 150c and the sealing member 300.

The present invention is not to be construed as being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

The invention claimed is:

1. A heat exchanger for a motor vehicle coupled to an inner surface of a heat exchanger mounting part of a carrier or an air guide including a heat exchanger mounting part having an air inlet formed therein:
   the heat exchanger comprising:
   a sealing member configured to be disposed between a circumference of the heat exchanger and the heat exchanger mounting part to seal a coupling part between the heat exchanger and the heat exchanger mounting part,
   wherein the sealing member includes:
   a resin body configured to be coupled to the heat exchanger; and
   a sealing part made of a rubber material configured to have one end coupled to the body and the other end being in close contact with the heat exchanger mounting part,
   wherein the resin body is formed with a sealing part coupling that protrudes and extends forward from the bottom,
   wherein the sealing part is formed to allow one end is coupled to the end of the sealing part coupling, and the other end extending to the heat exchanger mounting part, and to inclinedly extend to a front side of the vehicle, and
   wherein the sealing part's end contacts inclinedly to the heat exchanger mounting part.

2. The heat exchanger for a motor vehicle of claim 1, wherein
   the sealing part includes:
   a first sealing part configured to have one end fixed to a front side of the vehicle on the body and the other end extending to the heat exchanger mounting part; and
   a second sealing part configured to have one end fixed to the first sealing part of the body on a rear side of the vehicle and the other end extending to the heat exchanger mounting part.

3. The heat exchanger for a motor vehicle of claim 2, wherein
   the first sealing part
   is formed to allow the other end to extend to the heat exchanger mounting part, and to inclinedly extend to the front side of the vehicle, and
   the second sealing part
   is formed to allow the other end to extend to the heat exchanger mounting part, and to inclinedly extend to the rear side of the vehicle.

4. The heat exchanger for a motor vehicle of claim 2, wherein
   the first and second sealing parts
   are formed to allow the other end to extend to the heat exchanger mounting part, and to inclinedly extend to the front side of the vehicle.

5. The heat exchanger for a motor vehicle of claim 3, wherein
   inclinations of the first and second sealing parts
   are 25 to 35° with respect to a horizontal plane.

6. The heat exchanger for a motor vehicle of claim 2, wherein
the sealing part
has an annular cross section in a form that the first and second sealing parts are disposed to be spaced apart along front and rear directions of the vehicle, and each one end portion and the other end portion are connected to each other.

7. The heat exchanger for a motor vehicle of claim 1, wherein
the body
includes a coupling groove recessed to be fitted into a protrusion of the heat exchanger.

8. The heat exchanger for a motor vehicle of claim 7, wherein
the coupling groove formed in the body
is fitted into the protrusion of the support provided at a lower end of the heat exchanger.

9. The heat exchanger for a motor vehicle of claim 7, wherein
the body
is integrally formed with at least one separation prevention protrusion protruding inward from an inner surface of the coupling groove.

10. The heat exchanger for a motor vehicle of claim 9, wherein
the separation prevention protrusion
is formed to protrude from the inner surface of the coupling groove on the front side of the vehicle toward the rear side of the vehicle or from the inner surface of the coupling groove on the rear side of the vehicle toward the front side of the vehicle.

11. The heat exchanger for a motor vehicle of claim 10, wherein
the separation prevention protrusion
is inclined in an opposite direction to a coupling direction of the heat exchanger as the separation prevention protrusion goes toward an end portion to facilitate coupling by elastic deformation during fitting of the heat exchanger, and prevent the heat exchanger from separating by an elastic restoring force after the coupling.

12. The heat exchanger for a motor vehicle of claim 1, wherein
the heat exchanger comprises:
a support for fixing the heat exchanger to a carrier of the vehicle,
the body is fitted into the support, and
the support is provided on an upper side or a lower side, or both the upper and lower sides of the heat exchanger.

* * * * *